United States Patent [19]

Torck et al.

[11] 3,903,192

[45] Sept. 2, 1975

[54] PROCESS OF ISOMERIZING SATURATED HYDROCARBONS WITH A CHLORINATED CATALYST

[75] Inventors: Bernard Torck, Boulogne sur Seine; Jean-Pierre Franck, Bougival; Jean-Francois Le Page, Rueil-Malmaison, all of France

[73] Assignee: Institut Francaise du Petrole, des Carburants et Lubrifiants, Rueil-Malmaison, France

[22] Filed: Apr. 15, 1974

[21] Appl. No.: 460,995

[30] Foreign Application Priority Data
Apr. 16, 1973 France............................. 73.13813

[52] U.S. Cl. ..................... 260/683.68; 260/666 P
[51] Int. Cl............................................. C07c 5/30
[58] Field of Search ....... 260/683.68, 683.65, 666 P

[56] References Cited
UNITED STATES PATENTS

| | | |
|---|---|---|
| 2,908,735 | 10/1959 | Haensel ........................ 260/683.68 |
| 3,182,013 | 5/1965 | Myers ........................... 260/683.68 |
| 3,322,688 | 5/1967 | Starnes ......................... 260/683.68 |
| 3,322,689 | 5/1967 | Giannetti et al. ............. 260/683.68 |
| 3,330,779 | 7/1967 | Giannetti et al. ............. 260/683.68 |
| 3,441,514 | 4/1969 | Giannetti et al. ............. 260/683.68 |
| 3,449,264 | 6/1969 | Myers ........................... 260/683.68 |
| 3,553,281 | 1/1971 | Goble et al. .................. 260/683.68 |

*Primary Examiner*—Delbert E. Gantz
*Assistant Examiner*—G. J. Crasanakis
*Attorney, Agent, or Firm*—Millen, Raptes & White

[57] ABSTRACT

Saturated hydrocarbons are isomerized with a catalyst which incorporates chlorine and at least one compound of a metal from Groups VI-B and VIII on an alumina carrier. The chlorine is introduced into the catalyst as a mixture of (1) at least one chlorinating agent selected from chlorine and hydrochloric acid and (2) at least one carbon compound selected from carbon disulfide and carbon oxysulfide.

12 Claims, No Drawings

PROCESS OF ISOMERIZING SATURATED HYDROCARBONS WITH A CHLORINATED CATALYST

This invention concerns the manufacture of catalysts which may be used for isomerizing paraffins having 4 or more carbon atoms at relatively low temperatures, for example lower than 200° C. The invention also concerns an isomerization process making use of the resulting catalysts.

It is known that, at temperatures higher than 300° C, it is possible to isomerize saturated hydrocarbons having 4 or more carbon atoms, by means of conventional catalysts of the type of platinum deposited on alumina-silica, halogenated alumina or other acid carriers. For example, the alumina may have a chlorine content of about 1%. In order to operate at a lower temperature where the formation of isoparaffine is favoured thermodynamically, it has been proposed to manufacture more active catalysts either by depositing aluminum chloride on platinum-containing alumina or by chlorinating a platinum-alumina catalyst in such a manner that its chlorine content be from 6 to 12% by weight. The commonly used chlorinating agents are the chlorinated hydrocarbons such as carbon tetrachloride or chloroform and it is known and noticeable that chlorine or hydrochloric acid are not convenient for obtaining catalysts sufficiently active at a temperature above 200°C.

The process for manufacturing a catalyst according to the invention comprises introducing halogen and at least one compound of a metal from group VI B and/or VIII of the periodic classification of elements into an alumina carrier and is remarkable in that the halogen is introduced as a mixture of chlorine and/or hydrochloric acid and carbon disulfide and/or carbon oxysulfide.

The introduction of halogen can be made before or together with the introduction of the metal compound, but it is preferred to introduce first the metal compound and only thereafter the halogen.

There is so obtained a catalyst for isomerizing paraffins which is active at as low a temprature as 100°C and in which the noble metal, more particularly platinum, is in a very active form so that it is not necessary to prereduce it with hydrogen at high temperature. Such a reduction may be carried out, for example, at a temperature from 100° to 500°C.

The resulting catalyst has a very good initial activity but tends to deactivate during time. It is observed, and this constitutes another object of the present invention, that, when introducing a promoter into the catalyst, it is possible to maintain its initial activity over a very long time. The promoter may be a halogen, a halohydric acid or a compound capable of generating said acid such as a halogenated hydrocarbon. This promoter may also be selected from the aromatic poly-hydroxy-, polyoxo-, or polyhydrocarbyloxy compounds, as defined in French Pat. No. 2,158,741 and in U.S. Pat. application No. 300,587 filed on Oct. 25, 1972.

This invention therefore concerns a process for converting hydrocarbons and, more particularly, a process for isomerizing saturated aliphatic or naphthenic hydrocarbons in the presence of a solid catalyst obtained as mentioned above and of a promoter which may be a halogen, a halohydric acid or a halogenated compound but which is advantageously a poly (hydroxy, hydrocarbyloxy and/or oxo) aromatic compound. We may also use said catalyst in a reforming process or in a process for the production of aromatic hydrocarbons, in which the feed charge is for example a naphta distilling from 60° to 220°C, which is treated in the presence of hydrogen at a temperature from 300° to 600°C, under a pressure from 5 to 20 kg/cm$^2$, the reaction hourly rate being from 0.5 to 10 volumes of liquid charge per volume of catalyst.

The carrier consists essentially or entirely of alumina. The aluminae which are the most convenient for the manufacture of these catalyst are porous aluminae of high specific surface containing hydrogen which is generally supposed to be in the form of hydroxy groups. For example, excellent results may be obtained with aluminae prepared by roasting a β-alumina trihydrate such as bayerite or a mixture of this type of alumina with other roasted alumina hydrates; however, aluminae prepared by roasting other alumina hydrates such as alpha alumina trihydrates or gybbsite, alpha alumina monohydrates or aluminae obtained by hydrolysis of of aluminum alcoholates may also be convenient. Such aluminae are generally remarkable by their high specific surface, usually from 180 to 500 m$^2$/g or even more. The most active catalysts are generally obtained when said surface is greater than 200 m$^2$/g and more particularly when it is greater than 300 m$^2$/g. This factor is however not the most significant since the content of hydroxy groups at the time of the chlorination also has a substantial effect on the catalyst activity. Consequently, the thermal treatments at temperatures from 250° to 800°C for the manufacture of aluminae must be so conducted as to obtain a high specific surface and more particularly an optimal proportion of hydroxy groups.

It may be desirable in some cases to select as carrier an alumina containing a certain proportion of one or more refractory oxides selected from the oxides of metals from groups II to V of the periodic classification of elements. Thus, the alumina may contain up to about 50% by weight of such oxides as those of silicon, titanium, berylium, zirconium or magnesium.

The alumina preferably contains a relatively low amount of a metal or metal compounds having a hydrogenating action, pertaining to groups VI to VIII of the periodic classification. The preferred metal is a metal from the family of platinum and its proportion by weight with respect to the carrier may be from 0.01 to 5% by weight and preferably from 0.1 to 2% by weight. The most convenient metals from the platinum group are platinum and palladium. The catalyst may also contain couples of catalytic metals, for example the couples: platinum-iridium, platinum-ruthenium, platinum-tungsten, and platinum-thallium. When using a metal from group VI B (chromium, molybdenum or tungsten) its proportion is generally from 0.005 to 5% by weight with respect to the catalyst carrier and, preferably, from 0.05 to 3%.

The metal must be in the most possible dispersed state at the surface of the catalyst and convenient methods for obtaining said required dispersion state consist either to precipitate the metal from the platinum group in the form of a sulfide or to impregnate the catalyst, for example by means of chloroplatinic acid in such a way as to favour a homogeneous impregnation, by addition to the medium of compounds which may result in a competitive chemisorption on the carrier, thereby favouring a better distribution of the metal on the surface of the catalyst. Although this is not strictly required, it is however preferable to conduct the reduction of the metal compound with hydrogen before the chlorination of the catalyst. A carrier which is perfectly convenient may consist of a conventional reforming catalyst, as available on the market, generally with an alumina carrier.

The halogen amount added to the catalyst may be from 1 to 20% by weight and more particularly from 4 to 15%, the optimum amount depending on the specific surface of the carrier. Chlorine or hydrochloric acid is introduced into the catalyst in the presence of carbon disulfide or oxysulfide in the vapor phase at a temperature from 100° to 400°C and, preferably, from 120° to 320°C. The reaction between chlorine and alumina in the presence of carbon disulfide or oxysulfide is carried out preferably under atmospheric pressure, although other pressures may also be convenient. The reactants must be injected simultaneously at the inlet of the reactor in a molar ratio of chlorine or HCl to carbon disulfide or carbon oxysulfide, between for example, 0.5 and 10 and more particularly from 3 to 7. These reactants, maintained in such a molar ratio, may be injected as such, but is preferable to dilute them with an inert gas such as nitrogen. In order to obtain a catalyst having a chlorine content sufficient to obtain an active catalyst, it is necessary to inject chlorine in a proportion of from 5 to 100% with respect to the catalyst and more particularly from 15 to 60% by weight of the latter.

The resulting catalyst, after chorination, has a certain activity for isomerizing paraffins and for reforming, but this acticity decreases with time. In order to maintain this catalytic acticity, we may inject continuously a promoter, such as hydrochloric acid or a compound capable of generating hydrochloric acid such as chlorine or chlorinated hydrocarbons, i.e. any one of the partial or total substitution products of saturated or unsaturated hydrocarbons having from 1 to 20 carbon atoms. The chlorinated hydrocarbons which may be used to introduce continuously chlorine into the catalyst are, for example, carbon tetrachloride, chloroform, methylene chloride, methyl chloride, ethyl chloride, isopropyl chloride, tertiobutylchloride, dichloroethane, hexachloroethane. These chlorinated compounds, chlorine or hydrochloric acid, are preferably introduced in solution in the feed charge. They are used in a proportion, expressed as chlorine, which is preferably from 10 to $10^4$ parts per million of parts by weight of the feed charge.

The catalyst may also be activated by other promoters which are aromatic compounds having at least two groups selected from hydroxy, hydrocarbyloxy and oxo groups. The aromatic compound is a compound having for example the formula $(R)_m Ar(Z)_x$ in which $x$ is an integer greater than 1 (preferably from 2 to 4), $m$ is either 0 or an integer, the sum $(x + m)$ being not greater than the maximum valence of Ar, Ar is an aromatic radical and the $m$ groups R, identical or different, are substituents, for example halogen atoms or hydrocarbon monovalent radicals which, for example, may each contain from 1 to 20 carbon atoms. The Z groups, identical or different, are selected from the group consisting of —OH, = O and - OR', R' being a hydrocarbon monovalent radical, for example, alkyl having preferably from 1 to 6 carbon atoms. In these compounds, some aromatic rings may be replaced by carbon-containing conjugated rings including heteroatoms particularly N,O. We may use also a mixture of compounds of these various types.

The aromatic compound is preferably a compound containing at least one benzene ring and having the general formula $$Y_n C_6 H_{4-n}(Z)_2$$

in which the Y groups may be for example alkyl, cycloalkyl or aryl groups, condensed or not with the benzene ring or electronegative groups such as chlorine or another halogen. For example Y may be a methyl, ethyl, n-propyl, isopropyl, n-butyl, isobutyl or tertio-butyl group; $n$ is zero or an integer such as 1, 2, 3 or 4. As examples of compounds containing at least one benzene ring, substituted by at least two hydroxy groups or two oxo groups, we will mention:

as compounds containing a single benzene ring: pyrocatechol, resorcinol, hydroquinone, benzoquinone, quinhydrone and their substituted derivatives; 3,4-dihydroxytoluene, chloro, fluoro or bromocatechols, chloro, fluoro or bromoresorcinols, chloro, fluoro or bromohydroquinone, chloro, fluoro or bromoquinones such, for example, as 4-chlorocatechol, 4-chlororesorcinol, tetrachlorohydroquinone, tetrafluorocatechol, chloranil, fluoranil, 2-chloro 1,4-benzoquinone, 4-chloro 1,2-benzoquinone, 2,5-dimethyl 1,4-benzoquinone;

as polyphenols: pyrogallol, hydroxyquinol, phloroglucinol; as compounds containing several benzene rings: 1,3-dihydroxynaphthalene, 2,3-dihydroxynaphthalene, 1,3-dihydroxynaphthalene 5,7-disulfonic acid, 1,2-dihydroxy and 9,10-dihydroxy anthracenes, 1,2,10-trihydroxyanthracene, 3,4-dihydroxyphenanthrene, 2,5-dimethyl 1,4-naphthoquinone, 2-chloro 1,4-naphthoquinone, 1,4naphthoquinone, 5-hydroxy 1,4-naphthoquinone, 1,8-dihydroxy 2-methylanthraquinone, 6-bromo 1,4-dihydroxy 9-10anthraquinone, 1,4-dihydroxy 9,10-anthraquinone, 9,10-phenanthraquinone, 9-10-anthraquinone, acenaphthenequinone, alizarine, chloranilic acid, 1,2,7-trihydroxy 9,10-anthraquinone, 1,4-anthraquinone.

As compounds containing hydrocarbyloxy radicals we may mention: 1-(or 2 or 3) methoxyphenol, pyrocatechol dimethylether, resorcinol diethylether, hydroquinone dimethylether, 3-methoxy-4-hydroxytoluene, 2-isopropyl hydroquinone diethylether, chloro, fluoro, and bromo-pyrocatechol, resorcinol and hydroquinone dimethylethers, phloroglucinol trimethylether, pyrogallol trimethylether, 2,3-(or 2,6) (or 3,5) dimethoxyphenol, 3,4,5-trimethoxyphenol, 2,3-dimethoxynaphthalene, 1-hydroxy 3-methoxynaphthalene and 4,5-dihydroxy 7-methoxyanthraquinone.

When using as promoters the above-defined aromatic compounds, the chlorination with chlorine or with hydrochloric acid, in the presence of carbon disulfide or carbon oxysulfide, may be carried out before, after, or during the introduction of the aromatic compound. The poly (hydroxy, hydrocarbyloxy or oxo) aromatic compounds may be introduced into the catalyst in different manners. We can use the conventional impregnation techniques comprising for example, contacting the catalyst with a solution of the selected compound in a suitable solvent, for example water; a chlorinated hydrocarbon or a saturated or unsaturated hydrocarbon. We may also introduce the aromatic compound during the chlorination by using a solution of the selected compound in carbon disulfide or carbon oxysulfide or in a chlorinated hydrocarbon or by carrying said compound with the inert gas used during the chlorination. We may also, in a first step, subject the catalyst to chlorination and subsequently introduce the aromatic compound in solution in the hydrocarbon to be isomerized. In any way, the aromatic compound must be introduced in one or more fractions, in a perfectly determined time, so that after this introduction, the catalyst contains from 0.001 to 20% and, preferably, from 0.01 to 10% by weight of aromatic compound.

The present invention concerns a catalyst prepared in the above-described manner and also the use of said satalyst for isomerizing saturated hydrocarbons and more particularly for isomerizing aliphatic or naphthenic hydrocarbons so as to obtain products of higher octane number than the feed charge, which may be used in motor fuels, i.e. branched or unbranched aliphatic or naphthenic hydrocarbons having 4 carbon atoms or more and a boiling point lower than 200°C and, more particularly, the aliphatic or napthenic hydrocarbons having from 4 to 7 carbon atoms per molecule, such for example as n-butane, n-pentane, n-hexame, methylpentanes, methylcyclopentane, cyclohexane, heptane or mixtures thereof. When only normal paraffins are to be isomerized, the feed charge may be preliminarily treated so as to separate the n-paraffins from the other hydrocarbons by using separation techniques, such for example as those making use of molecular sieves. As examples of industriel mixtures containing such hydrocarbons, we may mention the top products from straight run distillation of light naphta fractions or still hydrogenated light steam-cracking cuts. In the process of isomerizing saturated hydrocarbons, the feed charge is contacted with the above-described catalyst in the presence of hydrogen at a temperature from 25° to 400°C and, more particularly, from 80° to 180°C. The hydrocarbons may be maintained in the reactor either in the liquid form or in a gaseous form and the reaction may be conducted at a pressure from 1 atmosphere to 150 kg/cm$^2$ and preferably from 10 to 70 kg/cm$^2$. The reaction must be carried out in the presence of hydrogen with a molar ratio of the hydrogen to the hydrocarbon of, for example, from 0.01 to 20 and preferably from 1.50 to 10. The spatial velocity of introduction of the hydrocarbon into the reactor is from 0.05 to 10 v.v.h and, preferably, from 0.2 and 5.0 v.v.h.

The feed charge is advantageously free from sulfur, water and aromatic hydrocarbons.

The preparation of the catalyst and its use in the reaction of isomerization of paraffins at low temperature are illustrated in the following examples:

EXAMPLE 1

(comparative)

We place 100 g of a reforming catalyst of the commercial type, consisting of an alumina of high specific surface (350 m$^2$/g) containing 0.35% by weight of platinum and 0.4% by weight of chlorine, in a reactor heated to 230°C and scavenged with a nitrogen stream at a rate of 60 liters per hour. Chlorine is introduced for 1.5 hour at a rate of 12 liters per hour. The chlorine injection is stopped; nitrogen is replaced by hydrogen and the isomerization reaction of n-pentane is carried out in the following conditions: pressure 30 kg/cm$^2$, temperature 150°C, H$_2$ flow rate: 60 liters per hour, n-C$_5$ feed rate 150 cc/hr, water content of n-C$_5$ < 5 ppm by weight.

The effluent contains only from 0.5 to 1% of isopentane, thus showing that the chlorine alone is not capable of efficiently activating the platinum on alumina catalyst.

EXAMPLE 2

The preceding experiment is repeated while introducing, simultaneously with chlorine, carbon disulfide at a rate of 10 g/h. The results of n-pentane isomerization, conducted under the same conditions as in example 1, are reported in the following table:

TABLE I

| Product % b.w | Time in hours 10 | 50 | 100 | 200 |
|---|---|---|---|---|
| <C$_5$ | 0.5 | 0.43 | 0.40 | 0.30 |
| iso - C$_5$ | 72.3 | 72.22 | 71.0 | 65.5 |
| n - C$_5$ | 27.2 | 27.35 | 28.6 | 34.2 |

EXAMPLE 3

The preceding experience is repeated while changing the pentane isomerization conditions inasmuch as we continuously introduce into the pentane t-butyl chloride in a proportion of 500 ppm by weight. The results are given in table II below. Identical results have been obtained by replacing t-butyl chloride with hydrochloric acid, chlorine or methyl chloride.

TABLE II

| Product % b.w | Time in hours 10 | 50 | 100 | 300 | 500 | 800 |
|---|---|---|---|---|---|---|
| <C$_5$ | 1.0 | 1.2 | 1.0 | 0.8 | 0.75 | 0.8 |
| iso C$_5$ | 68.5 | 70.4 | 72.0 | 72.0 | 72.50 | 72.0 |
| n C$_5$ | 30.5 | 28.4 | 27.0 | 27.2 | 26.75 | 27.2 |

EXAMPLE 4

We impregnate 100 g of reforming catalyst of the commercial type, consisting of an alumina of high specific surface (350 m$^2$/g) containing 0.6% by weight of platinum, with a solution of pyrocatechol in chloroform at room temperature and in such conditions that the pyrocatechol content, after evaporation of the chloroform, is equal to 3% by weight.

The catalyst is then brought to 150°C for 2 hours in a nitrogen stream.

It is then supplied to the isomerization reactor which is brought to 250°C under nitrogen stream at a rate of 50 liters per hour. We introduce gaseous hydrochloric acid and carbon oxysulfide at respective flow rates of 20 liters per hour and 15 g per hour during 2 hours. Nitrogen is then replaced with hydrogen and the n-pentane is isomerized in the following conditions: pressure 20 kg/cm$^2$, temperature 125°C, H$_2$ flow rate: 60 liters per hour, n-C$_5$ feed rate 150 cc/h, water content of n-C$_5$ < 5 ppm by weight.

The products, which are analyzed by vapor phase chromatography, have the composition reported in the following table III.

TABLE III

| Product % b.w | Time in hours 10 | 50 | 100 | 300 |
|---|---|---|---|---|
| <C$_5$ | 0.1 | 0.30 | 0.30 | 0.35 |

TABLE III-continued

| Time in hours Product % b.w | 10 | 50 | 100 | 300 |
|---|---|---|---|---|
| iso C$_5$ | 36.0 | 55.0 | 58.3 | 59.45 |
| n C$_5$ | 63.9 | 44.7 | 41.4 | 40.2 |

EXAMPLES 5 to 10

We impregnate 100 g of a catalyst consisting of an alumina whose content of η alumina is about 80% by weight and whose specific surface is 400 m$^2$/g, containing 0.35% by weight of platinum (in example 6, platinum is replaced by palladium) with a solution of an aromatic poly (hydroxy, hydrocarbyloxy or oxo) compound in chloroform at room temperature, so that the content of aromatic compound be, after evaporation of the solvent, equal to the percentage by weight with respect to the catalyst given in table IV. The catalyst is then introduced into the isomerization reactor which is brought to a temperature of 275°C under nitrogen stream at a flow rate of 30 liters per hour. We introduce chlorine and carbon disulfide at respective flow rates of 15 liters per hour and 15 g per hour for one hour and a half. Nitrogen is then replaced by hydrogen and the isomerization reaction is carried out with a light gasoline whose composition by weight is a follows:

isopentane: 17.6%, n-pentane: 28.0%; iso-hexanes: 24.7%; n-hexane: 24.6%; naphthenes: 4.1%; n-heptane: 1%.

The test conditions are as follows:
Temperature: 130°C
Pressure in the reactor: 40 kg/cm$^2$
Molar ratio H$_2$/hydrocarbons: 2.5
Flow rate of light gasoline: 1 v.v.h. (volume/volume of catalyst/hour)
Water content of the feed charge < 10 ppm by weight.

The results are reported in table IV which gives the percentage with respect to the catalyst of the selected aromatic compound and the analysis of the effluent after a run of 50 to 100 hours.

ture is decreased to 150°C and nitrogen is replaced by hydrogen. We then introduce a solution of benzoquinone in n-pentane (2 g/l) at a flow rate of 100 cc/h. 400 cc of said solution are thus used. The isomerization of n-pentane is carried out in the conditions of example 4. The results are given in table V below.

TABLE IV

| Time in hours Product % b.w. | 10 | 20 | 40 | 80 | 120 |
|---|---|---|---|---|---|
| <C$_5$ % | 0.15 | 0.15 | < 0.20 | 0.20 | < 0.25 |
| iso C$_5$ | 35.0 | 45.0 | 52.0 | 56.0 | 60.5 |
| n C$_5$ | 64.85 | 54.85 | 47.8 | 43.8 | 39.25 |

EXAMPLE 12

We introduce 50 g of a usual reforming catalyst consisting of γ alumina having a specific surface of 250 m$^2$/g and containing 0.34% b.w. of platinum into an isomerization reactor and we increase the temperature to 300°C under a nitrogen stream at a flow rate of 50 l/h. We introduce chlorine and carbon disulfide at respective flow rates of 12 liters/h and 10 g/h for ½ hour and then, while passing chlorine at the same flow rate, we introduce, for 1 hour, a solution of 1,2-dimethoxybenzene in carbon sulfide containing 10% b.w. of 1,2-dimethoxy benzene, at a flow rate of 10 g/h. The isomerization of n-pentane is performed in the conditions of examples 5 to 10.

The results are reported in table VI.

| Time in hours product % b.w. | 10 | 20 | 50 | 100 | 200 |
|---|---|---|---|---|---|
| <C$_5$ | 0.85 | < 0.9 | 0.95 | < 0.85 | < 0.80 |
| isopentane | 65.50 | 69.0 | 70.05 | 70.05 | 71.0 |
| n-pentane | 33.65 | 30.1 | 29.0 | 28.65 | 28.2 |

We claim:
1. In a process for the isomerization of saturated hy-

TABLE IV

| Example n° | Compound | Amount % b.w. | Analysis after 50 hours | | | Analysis after 100 hours | | |
|---|---|---|---|---|---|---|---|---|
| | | | <C$_5$ % | %iso C$_5$ ΣC$_5$ | %iso C$_6$ ΣC$_6$ | <C$_5$ % | %iso C$_5$ ΣC$_5$ | %iso C$_6$ ΣC$_6$ |
| 5 | Pyrocatechol | 1.8 | 0.25 | 74.5 | 86.8 | 0.25 | 74.0 | 86.0 |
| 6 | Chlorohydroquinone | 1.6 | 0.30 | 72.5 | 82.5 | 0.30 | 74.0 | 87.0 |
| 7 | Fluoranil | 2.5 | 0.20 | 68.5 | 75.0 | 0.25 | 70.5 | 77.0 |
| 8 | Alizarine | 4.0 | 0.35 | 71.0 | 84.0 | 0.30 | 73.0 | 84.5 |
| 9 | Anthraquinone | 5.0 | 0.20 | 50.0 | 65.0 | 0.25 | 58.5 | 70.0 |
| 10 | Methoxy 4 phenol | 2.0 | 0.15 | 62.0 | 70.5 | 0.20 | 69.5 | 80.0 |

EXAMPLE 11

100 g of a catalyst consisting of an alumina with a high η alumina content whose specific surface is 300 m$^2$/g and containing 0.35% by weight of platinum is introduced into an isomerization reactor and brought to 280°C under a nitrogen stream at a flow rate of 50 liters/hour. We introduce chlorine and carbon disulfide at respective flow rates of 15 l/h and 15 g/h for 1 hour. After scavenging with nitrogen at 280°C, the temperadrocarbons at a temperature of 25° to 400°C in the presence of a catalyst comprising an alumina carrier having incorporated therein at least one compound of a metal selected from the group consisting of metals from groups VI B and VIII and chlorine:

wherein the improvement comprises that said catalyst has been produced by introducing said chlorine into the catalyst as a mixture containing:
1. at least one chlorinating agent selected from the group consisting of chlorine and hydrochloric acid, and 2. at least one carbon compound selected from the group consisting of carbon disulfide and carbon oxysulfide.

2. A process according to claim 1, comprising introducing from 1 to 20 % by weight of said chlorine into the catalyst.

3. A process according to claim 1, comprising introducing from 4 to 15 % b.w. of said chlorine into the catalyst.

4. A process according to claim 2, in which said chlorine is incorporated into the catalyst after incorporation of said metal compound into the alumina.

5. A process according to claim 1, further including the step of contacting said catalyst with at least one aromatic prompter selected from the group consisting of an aromatic polyhydroxy, an aromatic polyoxo, or an aromatic polyhydrocarbyloxy compound.

6. A process according to any of claim 1, in which said chlorine is incorporated at a temperature from 100° to 400°C.

7. A process according to claim 2, in which the molar ratio of said chlorinating agent to said carbon compound is from 0.5 to 10.

8. A process according to claim 7, in which chlorine and carbon disulfide is used as said mixture.

9. A process according to claim 7, in which hydrochloric acid and carbon disulfide is used as said mixture.

10. A process according to claim 7, in which the chlorinated catalyst is reduced with a treatment by hydrogen in the range of 100° to 500°C.

11. A process according to any of claim 1, in which said metal compound is a platinum compound.

12. A process according to claim 1, in which said isomerization is conducted at a temperature from 80° to 180°C in the presence of hydrogen.

* * * * *